United States Patent [19]

Cantwell

[11] Patent Number: 5,120,997
[45] Date of Patent: Jun. 9, 1992

[54] SPREAD SPECTION SIGNAL DETECTOR

[75] Inventor: Robert H. Cantwell, Sudbury, Mass.

[73] Assignee: Raytheon Company, Lexington, Mass.

[21] Appl. No.: 546,645

[22] Filed: Jul. 2, 1990

Related U.S. Application Data

[62] Division of Ser. No. 319,504, Mar. 6, 1989, Pat. No. 4,972,430.

[51] Int. Cl.⁵ .................. H03K 5/153; H03K 17/13
[52] U.S. Cl. .................................... 307/354; 375/1; 328/114; 328/150
[58] Field of Search .............. 307/354; 364/768, 780, 364/783, 786–788, 200, 900; 375/1

[56] References Cited

U.S. PATENT DOCUMENTS

| | | | |
|---|---|---|---|
| 4,682,302 | 7/1987 | Williams | 364/768 |
| 4,727,508 | 2/1988 | Williams | 364/768 |
| 4,749,879 | 6/1988 | Peterson et al. | 307/354 |

OTHER PUBLICATIONS

H. Braquet et al., "Zero-Crossing Detector", IBM Technical Disclosure Bulletin, (vol. 18, No. 1; p. 144; Jun. 1975.

Primary Examiner—Bernarr E. Gregory
Attorney, Agent, or Firm—Walter F. Dawson; Richard M. Sharkansky

[57] ABSTRACT

A spread spectrum signal detector for sampling a modulated carrier employing a zero-crossing detection means having two independent control loops, a first loop for a zero-mean threshold control and a second loop for AGC control. An IF sampler quantizeds the received spread spectrum signals at IF and provides high immunity to interference or jamming. The IF signal is sampled at a number of quarter cycle intervals to allow sampling in sequence of the in-phase (I) and quadrature-phase (Q) components. The output of the IF sampler is two bits, a sign bit and a magnitude bit. The zero-man threshold control loop using only the sign bit of the I and Q samples sets a threshold level (T0) to detect the zero-crossings of a received waveform. Two magnitude threshold levels are set at fixed offsets from the T0 threshold level. A normalized statistical accumulator using the magnitude bits of the I and Q samples determines the AGC control level for a fixed percentage of outside threshold crossings of the most significant magnitude bit. The I and Q samples are aligned in time, and every other pair of I and Q samples are inverted for digital demodulation of the IF samples to baseband. The baseband samples are provided to a signal processor for generating range and range rate information.

2 Claims, 10 Drawing Sheets

WHERE: SN = SIGN BIT (TRAILING LETTER N INDICATES NEGATIVE LOGIC)
M = MAGNITUDE BIT

SPREAD SPECTION SIGNAL DETECTOR

This application is a divisional of application Ser. No. 319,504, filed Mar. 6, 1989, now U.S. Pat. No. 4,972,430.

BACKGROUND OF THE INVENTION

This invention relates to spread spectrum signal processing and in particular to a method and apparatus for detecting zero-crossings of a pseudo-noise (PN) spread spectrum modulated signal which is translated to baseband by sampling an intermediate frequency (IF) signal.

A spread spectrum system as described in U.S. Pat. No. 4,550,414, issued Oct. 29, 1985 to Walter J. Guinon and Richard H. Lamb, Jr. and assigned to the Charles Stark Draper Laboratory, Inc , is one in which the transmitted signal is spread over a wide frequency band, much wider in fact than the minimum bandwidth required to transmit the information being sent. The following are three general types of modulation which produce spread spectrum signals: (1) Modulation of a carrier by a digital code sequence; such systems are called direct sequence modulated systems; (2) Carrier frequency shifting in discrete increments in a pattern dictated by a code sequence; these are called frequency hoppers because the transmitter jumps from frequency to frequency; and (3) Pulsed-FM or "chirp" modulation in which a carrier is swept over a wide band during a given pulse interval.

The term pseudo-noise (PN) refers to a predetermined apparently random pulse sequence having a recurring period or cycle which is long compared with a prevailing information or message duration. This pseudo-random pulse sequence is usually used in a direct sequence system which, in a binary phase shift keyed (BPSK) embodiment, involves a carrier which is 180° phase-shifted in accordance with the output of a pseudo-random-number code generator. Thus, the incoming signal consists of a sequence of phase transitions from one constant value to another.

More and more in communications and radar the modulated carrier signals depend entirely on when the signal crosses zero, rather than on its amplitude. Radar and communication signals are spread across the frequency spectrum to better resist interference and jamming instead of being transmitted at one frequency. Pseudo-noise (PN) spread spectrum modulation is employed in communications systems for purposes of security, anti-jam protection, multiple access capability or a safe level of power flux density radiated back to earth. When the interference and jamming signals are real strong, adaptive techniques are used to suppress such interference and jamming signals.

In the prior art, baseband sampling has been performed using dual A/D's, one for an I data channel and another for a Q data channel in addition to threshold control logic circuits as described in a paper by F. Amorasa titled "Adaptive A/D Converter to Suppress CW Interference in Spread-Spectrum Communications," IEEE transactions on Communications, Vol. Com-31, pp. 1117-1123, October 1983. This approach requires extra hardware for I and Q baseband mixing and analog to digital converters. The dual mixing and converters have bias problems due to gain and phase differences in each channel, and baseband adaptive techniques are more difficult to control making such a baseband system easier to jam.

SUMMARY OF THE INVENTION

In accordance with the present invention a spread spectrum signal detector apparatus and method is provided for detecting information signals such as pseudo-noise (PN) spread spectrum modulated signals in the presence of interference and jamming. The spread spectrum detector comprises means for receiving a spread spectrum signal, means coupled to the receiving means for sampling in sequence a modulated carrier of the received signal in order to generate in-phase (I) and quadrature-phase (Q) samples of the modulated carrier in accordance with threshold signals, means coupled to the outputs of the sampling means for aligning in time each sequential pair of the in-phase (I) and quadrature-phase (Q) samples of the modulated carrier, means coupled to the outputs of the I and Q samples aligning means for generating the threshold signals for coupling to the sampling mean, and means coupled to the outputs of the I and Q samples aligning means for generating an automatic gain control (AGC) signal for coupling to the receiving means. The threshold signals comprise a zero-means threshold signal level (T0) and offset threshold signal levels $T0+D1$ and $T0-D2$ above and below, respectively, the zero-mean threshold signal level (T0). The receiving means comprises means for receiving the AGC signal for setting a fixed percentage of threshold crossings outside the offset threshold signal levels. The sampling means provides a sign bit and a magnitude bit measurement for each sample of the I and Q.

The sampling means comprises a zero-crossing detector for performing sampling of the modulated carrier and comprises means for comparing the sampled modulated carrier signal to the threshold signal levels wherein a first one of the threshold signal levels (T0) is set for detecting zero-crossings of the sampled signal, a second one of the threshold levels $(T0+D1)$ is set for a positive increment above T0, and a third one of the threshold levels $(T0-D2)$ is set for a negative increment below T0, and means coupled to the comparing means for storing a sign and magnitude measurement of the sampled signal wherein the magnitude is stored in a first register if the magnitude is positive or stored in a second register if the magnitude is negative, with the selection of the first or second register being made in accordance with the stored sign measurement. The spread spectrum signal detector further comprises a demodulator means coupled to the I and Q samples outputs of the I and Q samples aligning means for converting the samples to baseband demodulated samples by inverting sign bits on every other pair of the I and Q samples. The AGC signal generating means comprises a statistical accumulator means for setting a level of the AGC signal based on the number of times a peak amplitude of the modulated carrier of the received signal exceeds the offset threshold signals $T0+D1$ and $T0-D2$, means coupled to a digital output of the statistical accumulator means for converting the digital output to an analog signal, and a low pass filter coupled to the digital to analog converter output for coupling the AGC signal to the receiving means.

In accordance with a further feature of the invention a receiver is provided for detecting spread spectrum modulated carrier signals comprising RF and IF receiving means, an IF sampler coupled to the receiving means for sampling in sequence the modulated IF carrier in order to generate in-phase (I) and quadrature-phase (Q) samples of the modulated carrier in accordance with threshold signals, an I and Q samples aligner coupled to the outputs of the IF sampler for aligning in time each sequential pair of the in-phase (I) and quadrature-phase (Q) samples of the modulated carrier, a zero-means threshold controller coupled to outputs of the I and Q samples aligner for generating the threshold signals for coupling to the IF sampler, AGC control coupled to the outputs of the I and Q samples aligning means for generating an automatic gain control (AGC) signal for coupling to the receiving means, a baseband demodulator coupled to the I and Q samples outputs of the aligner for converting the samples to baseband demodulated samples, and a processor coupled to the I and Q baseband demodulated samples outputs of the converting means for performing spread spectrum signal processing, wherein the I and Q baseband signals are aligned in time by an I and Q reference aligner for processing. The threshold signals comprise a zero-mean threshold signal level (T0) and offset threshold signal levels T0+D1 and T0−D2 above and below, respectively, the zero-mean threshold signal level. The IF sampler provides a sign bit and magnitude bit measurement for each sample of the I and Q, and it comprises a zero-crossing detector having a first comparator means for detecting phase reversals of the received signal, and second comparator means for detecting the magnitude of the received signal above predetermined thresholds. The baseband demodulator coupled to the I and Q samples outputs of the I and Q samples aligner converts the samples to baseband demodulated samples by inverting the sign and magnitude bits on every other pair of the I and Q samples. The AGC signal generater comprises a statistical accumulator for setting a level of the AGC signal based on the number of times a peak amplitude of the modulated carrier exceeds the offset thresholds signals T0+D1 and T0−D2, means, coupled to a digital output of the statistical accumulator, for converting the digital output to an analog signal, and a low pass filter, coupled to the digital to analog converter output, for coupling the AGC signal to the receiving means.

In accordance with a further feature of the invention, a method of detecting a spread spectrum signal comprising the steps of receiving a spread spectrum signal in means for processing a modulated carrier, sampling the modulated carrier of the received signal with a zero-crossing detector in order to generate in sequence in-phase (I) and quadrature-phase (Q) samples of the modulated carrier, aligning in time each sequential pair of the in-phase (I) and quadrature-phase (Q) samples of the modulated carrier with an I and Q samples aligning means, generating threshold signal levels from I and Q samples sign outputs of the I and Q samples aligning means for coupling to the zero-crossing detector, the levels including offset threshold signal levels, and generating an automatic gain control (AGC) signal for coupling to the receiving means from sign and magnitude outputs of said I and Q samples aligning means for setting a level of the AGC signal based on the number of times a peak amplitude of the modulated carrier exceeds the offset threshold signal levels. The step of generating threshold signals comprises the steps of, generating a zero-mean threshold signal level (T0), and generating offset threshold signal levels T0+D1 and T0−D2 above and below, respectively, the zero-mean threshold signal level. In addition, the step of sampling the modulated carrier of the received signal comprises the steps of comparing the sampled modulated carrier signal to the threshold signal levels, a first one of the threshold signal levels (T0) being set for detecting zero-crossing of the sampled signal, a second one of said threshold signal level (T0+D1) being set for a positive increment above T0, and a third one of the threshold signal levels (T0−D2) being set for a negative increment below T0, and storing a sign and magnitude measurement of the sampled signal wherein the magnitude is stored in a first register if the magnitude is positive or stored in a second register if the magnitude is negative, the selection of the first or second register being made in accordance with the stored sign or zero-crossings measurement.

BRIEF DESCRIPTION OF THE DRAWINGS

Other and further features of the invention will become apparent in connection with the accompanying drawings wherein.

DESCRIPTION OF THE PREFERRED EMBODIMENTS

Figure 1:
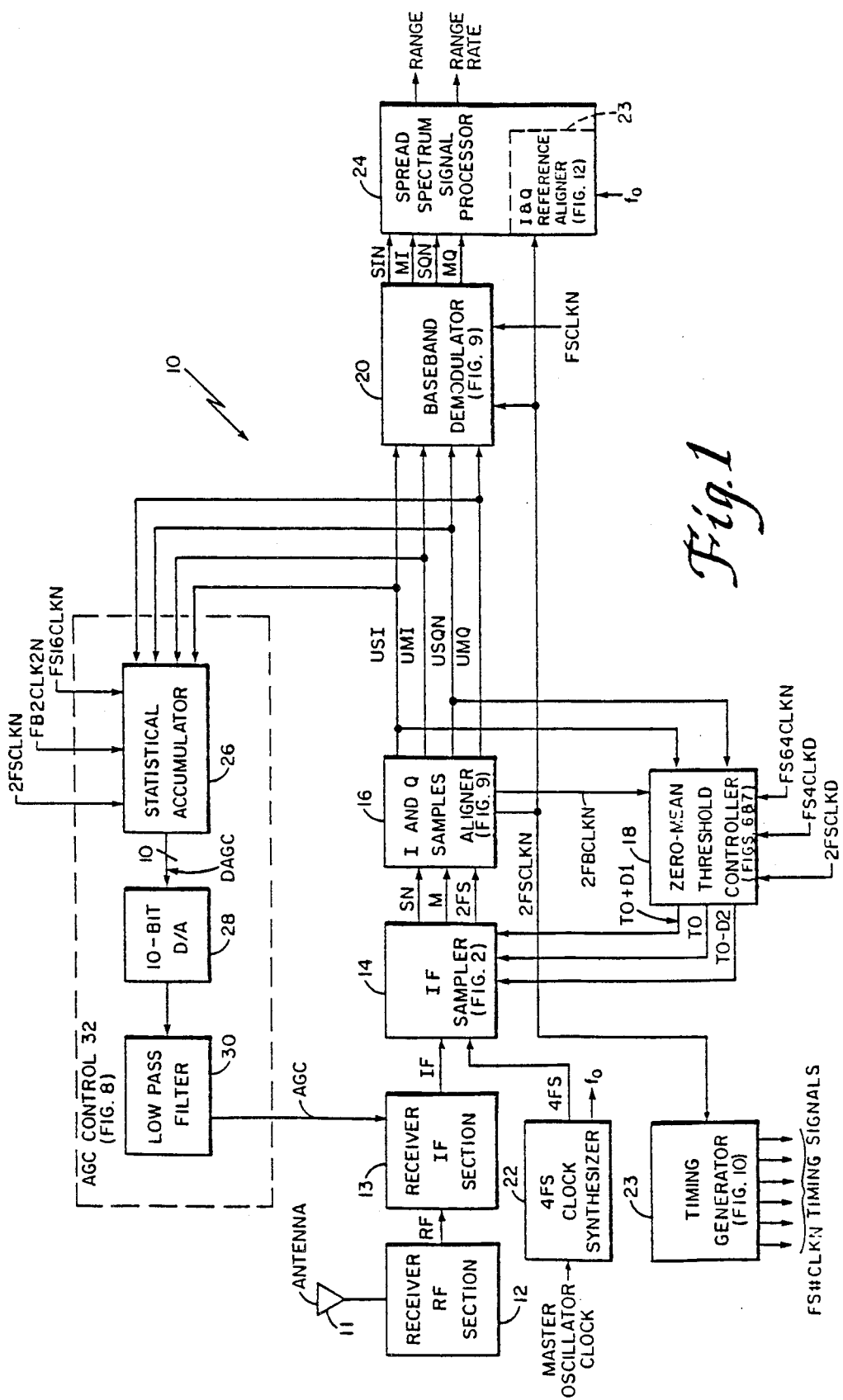
FIG. 1 is a block diagram according to the invention of an adaptive zero-crossing detector.

Referring now to FIG. 1, a functional block diagram is shown of the invention of a pseudo-noise (PN) spread spectrum receiver 10 employing zero-crossing detection of modulated spread spectrum signals. An antenna 11 receives a spread spectrum signal which is amplified by receiver RF section 12 and then the received modulated carrier is down-converted and match filtered by a receiver IF section 13 to the information or spread spectrum bandwidth. A clock synthesizer 22 receives a master oscillator clock signal and generates a 4FS clock sample signal. The IF signal from the receiver IF section 13 is coupled to an IF sampler 14 in addition to the 4FS clock sample signal. The IF sampler 14 quantizes the IF signal in accordance with the 4FS clock signal and threshold signal levels (T0+D1, T0, T0−D2) are set by a zero-mean threshold controller 18. The IF signal is sampled at a number of quarter cycle intervals to allow sequencing of the IF sampler 14 to alternately sample in-phase (I) and quadrature-phase (Q) signals. Each pair of the I and Q samples are aligned in the I and Q samples aligner 16 and every other pair of I and Q samples are inverted for digital demodulation of the IF signal samples to baseband by a baseband demodulator 20. An AGC control 32 loop coupled to the outputs of the I and Q samples aligner 16 provides an AGC signal to the receiver IF section 13 for setting a fixed percentage of outside threshold crossings (T0+D1 and (T0+D2). The baseband demodulator 20 demodulates the aligned I and Q samples from the aligner 16 to baseband outputs SIN, MI, SQN and MQ which are coupled to a spread spectrum signal processor 24. (NOTE: The trailing letter N at the end of a signal name such as SIN or SQN indicates negative logic). The spread spectrum signal processor 24 generates range (R) and range rate (dR/dt). When the received RF carrier signal modulation is binary phase-shift keying (BPSK), the pseudonoise codes that shift the phase 180° are the PN code transitions, which are equivalent to plus or minus one amplitude modulation.

Figure 2:
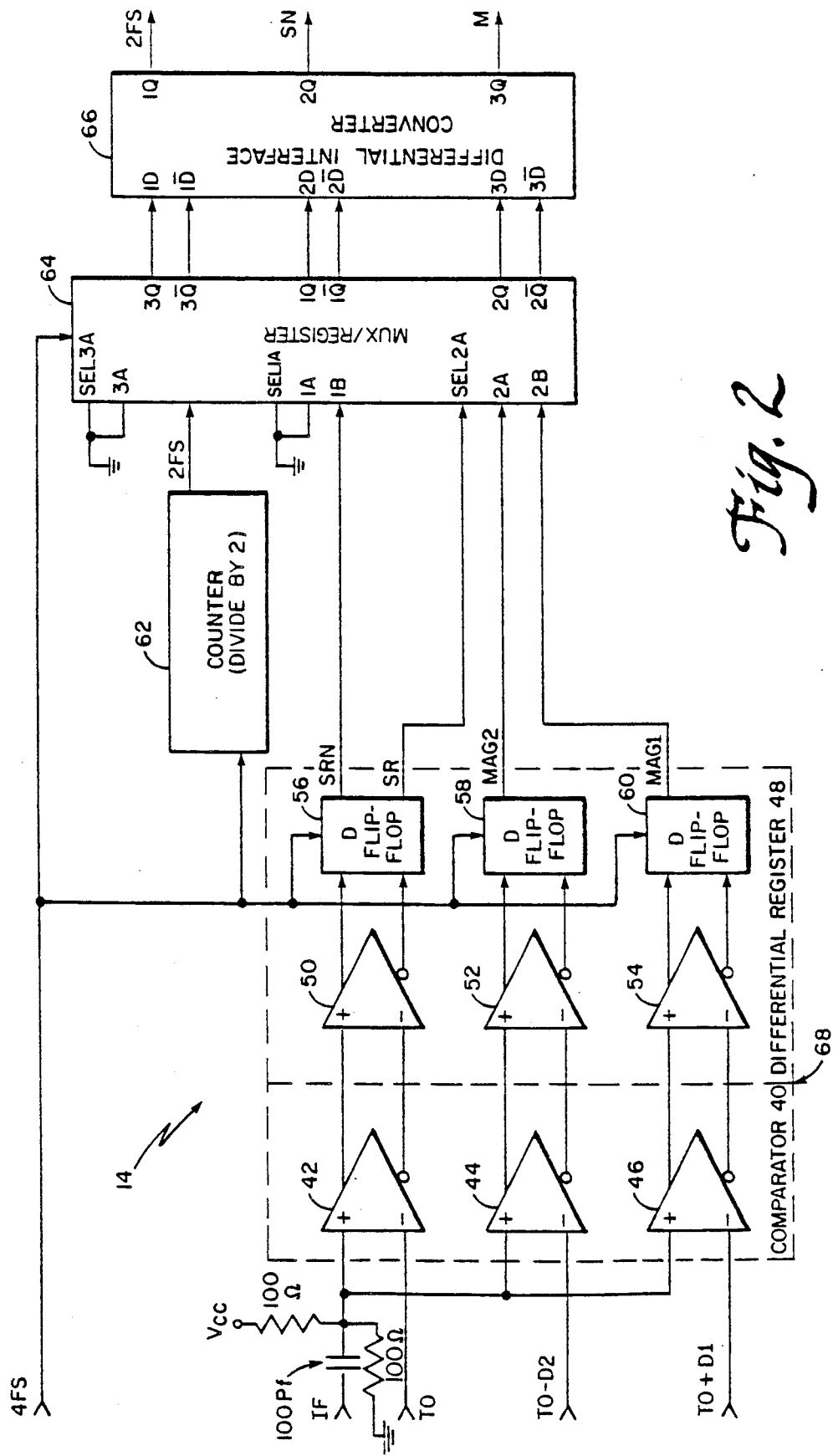
FIG. 2 is a functional diagram of an IF sampler.
Figure 3:
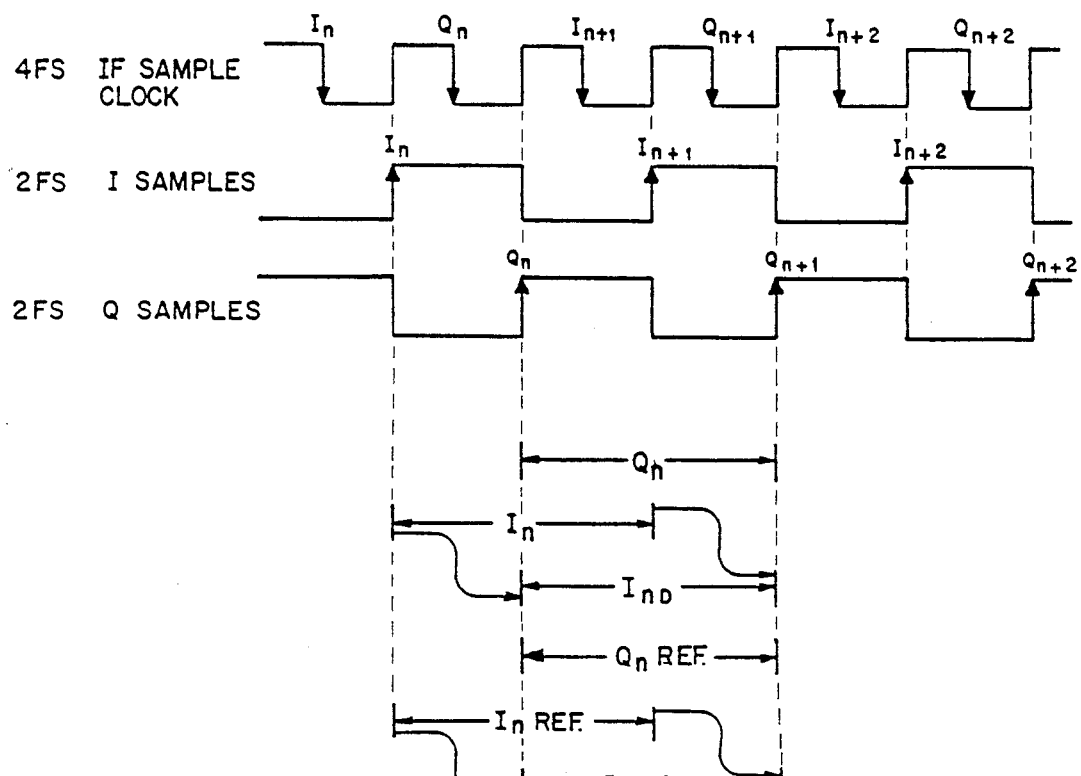
FIG. 3 is a timing diagram showing the 4FS and 2FS clock sample signals and the $I_n$ and $Q_n$ sample timer resulting in In and Qn samples which are aligned with reference signals $I_n$ REF and $Q_n$ REF in the spread spectrum signal processor.
Figure 4:
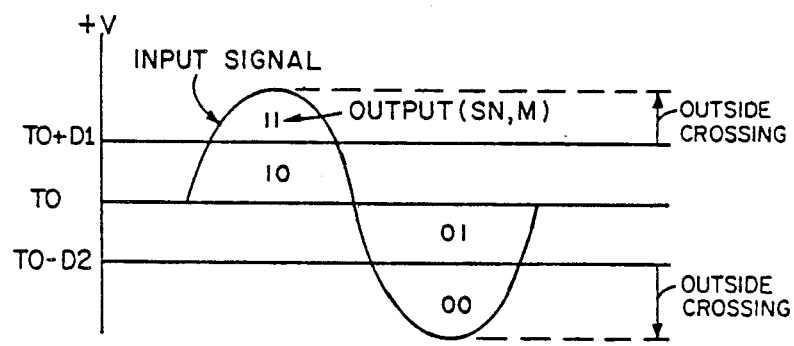
FIG. 4 shows a received input signal being measured according to set thresholds and the sign and magnitude logic level conventions.
Figure 10:
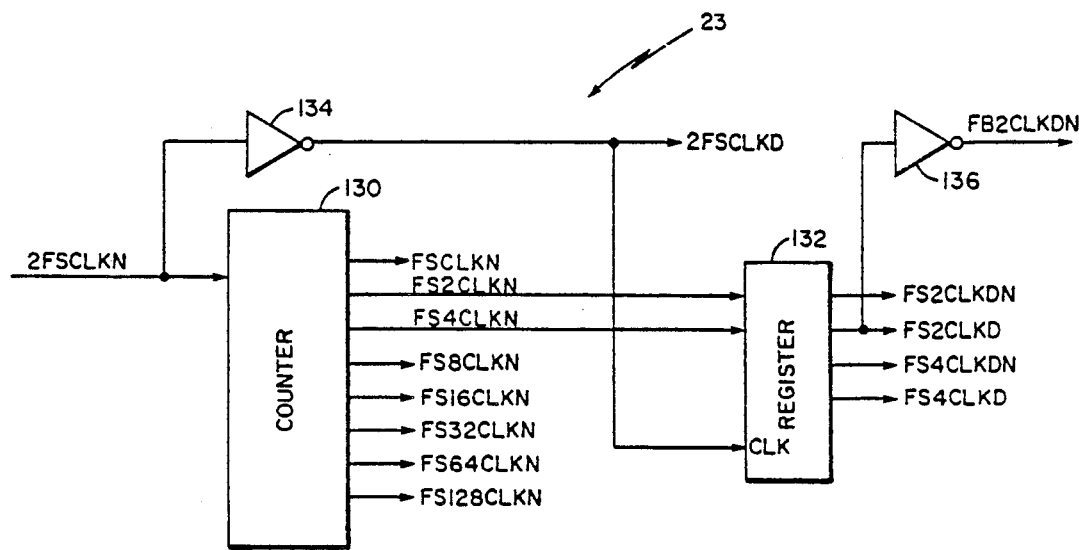
FIG. 10 is a block diagram of a timing generator for generating the timing signals of the spread spectrum signal detector.

Referring to FIGS. 1, 2, 3 and 4, the IF sampler 14 comprises a comparator 40 coupled to a differential register 48 as shown in FIG. 2 which together function as a zero-crossing detector 68. The IF sampler 14 quantizes the received signals at IF and provides high immunity to interference and jamming. The IF sample clock (4FS) for in-phase and quadrature samples is determined by the equation (4× IF)/N, where N is equal to an odd number. The 4FS clock is divided by 2 in the IF sampler 14 generating a 2FS clock signal as shown in FIG. 3. The 2FS clock is coupled to an I and Q samples aligner 16 which provides 2FSCLKN to a timing generator 23 which generates a plurality of clock timing signals (FS#CLKN) as shown in FIG. 10. The minimum output of the IF sampler 14 is two bits, a sign bit (SN) and a magnitude bit (M), for each I and Q sample. The IF signal is sampled at 90° increments such that even samples produce the in-phase (I) signal and odd samples produce the quadrature-phase (Q) signal. When a sample of an IF sine wave is at the zero-crossing set by T0, the next sample taken in quadrature (A number of quarter cycles or intervals later) is at the peak of the IF sine wave. The I and Q samples aligner 16 is coupled to the outputs of the IF sampler 14 and aligns in time and sorts the I and Q samples producing the sign and magnitude signals (USI, UMI, USQ and UMQ) which are coupled to the baseband demodulator 20. The USI and USQ signals are also coupled to the zero-mean threshold controller 18 where they are used to generate the threshold levels (T0+D1, T0, T0−D2) for the IF sampler 14. The zero-means threshold controller 18, using only the IF sampler 14 sign bit (SN), sorted for I and Q samples and aligned in time, sets the T0 threshold to detect the zero-crossings of the received IF signal waveform. The magnitude thresholds T0+D1 and T0−D2 are each a fixed offset from the T0 threshold as shown in FIG. 4. The sign bit (SN) and the magnitude bit (M) are generated by the IF sampler 14 in accordance with the threshold levels as shown in Table 1. The percentage $\theta$ of the most significant magnitude bit exceeding the outside thresholds (either T0+D1 or T0−D2) are referred to as "outside threshold crossings" which are used to control the gain of the receiver IF section 13 via the AGC control 32 loop. The USI, UMI, USQ and UMQ signals are coupled to the input of AGC control 32 for generating an AGC signal to the receiver IF section 13 for controlling the gain based on the percentage $\theta$ of outside threshold crossings for the most significant magnitude bit. The AGC Control 32 as shown in FIG. 1 comprises a statistical accumulator 26, which accomplishes the setting of the AGC level for the fixed percentage of outside threshold crossings for the most significant magnitude bit and generates a 10-bit output (DAGC) which is coupled to a 10-bit D/A 28. A low pass filter 30 receives the output of the 10-bit D/A 28 and couples the AGC signal to the receiver IF section 13. Hence, the PN spread spectrum receiver 10 has two independent and unconditionally stable control loops, one loop for zero-mean threshold control and the other loop for AGC control.

TABLE 1

| SN | M | SIGNAL THRESHOLD LEVEL |
|----|---|------------------------|
| 1  | 1 | Greater than T0 and T0 + D1 |
| 1  | 0 | Greater than T0 |
| 0  | 1 | Less than T0 |
| 0  | 0 | Less than T0 and T0 − D2 |

Referring to FIG. 2 and FIG. 4 which shows the functional diagram of the IF sampler 14, the zero-mean threshold signals (T0, T0+D1 and T0−D2) are each coupled to a reference input of comparators 42, 44, 46 respectively and the IF signal being sampled is coupled to a first input of each of the comparators 42, 44, 46. The zero-mean threshold signal T0 as described above sets the threshold for detecting the zero-crossing of the sampled waveform as shown in FIG. 4. The outputs from the comparators 42, 44, 46 are coupled to a differential register 48 comprising three D flip-flops 56, 58, 60 for storing the sign (S) and magnitude (M) for each sample of the IF signal taken in accordance with the 4FS sample clock. The sign and magnitude samples from the differential register 48 (SRN, SR, MAG2, MAG1) are coupled to a mux/register 64 which is also clocked by the 4FS clock signal. The mux/register 64 uses the sign bit SR from D flip-flop 56 to select the appropriate IF sampled magnitude, MAG 1 from D flip-flop 60 or MAG 2 from D flip-flop 58, and in accordance with the 4FS clock signal, the signals from the mux/register 64 are coupled to a differential interface converter 66 where output signals SN and M are provided in addition to the clock signal 2FS. An important feature of the present invention is that the digital state of the zero-crossing comparator 42 is stored (in D flip-flop 56) at the IF sample rate along with both magnitude comparator 44, 46 outputs stored (in D flip-flops 58, 60). The zero-crossing state indicated by the sign bit (SR) is used to select the plus or minus magnitude comparator output (MAG 1 or MAG 2) that agrees with the sign bit for this sign and magnitude sample.

Next, the following definitions are provided for the key parameters of the IF sampler 14 shown in FIG. 2:

Aperture Jitter is the variation or uncertainty concerning the exact time an IF sample is converted which imposes a limit on the rate of change of the IF analog input signal;

Aperture Time is the difference between the time of arrival of the analog input signal and when its digital state is captured by the 4FS sample clock in the IF sampler 14;

Comparator Offset is the difference between the threshold voltage applied to the comparator 40 and the actual threshold voltage used when the IF sample is converted from analog to a digital level above or below the threshold;

Comparator Hysteresis is included as part of the aperture jitter specification for an IF sampler 14, and it is set when the quadrature samples are taken for one phase at the zero-crossings of the IF and the other phase I or Q at the peak of the IF signal.

Figure 5:
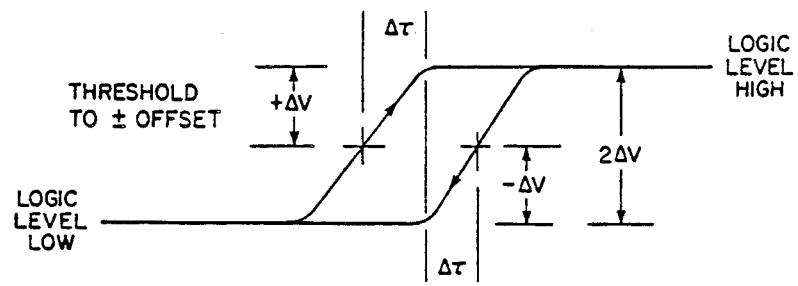
FIG. 5 shows the logic level transitions of the signal levels around the zero-mean threshold T0.

Referring to FIG. 2 and FIG. 5 the maximum rate of change at IF is for a sine wave; it occurs at the zero-crossing and is as follows:

$$d\left[\frac{A \sin wt}{dt}\right] = Aw \quad \text{when } t = 0$$

where:
A = Peak voltage level of the sine wave at IF
w = 2 f,
f = IF frequency

The maximum rate of change or slew rate of the comparator 42 is Aw and is equal to V/t as shown in FIG. 5. t is the aperture jitter for the IF samples and the comparator hysterisis is less than 2 V. The small signal gain of the comparator 40 is $20\text{LOG}(e_o/e_{in})$ where:

$e_o$ = minimum output logic transition from logic level 0 to logic level 1
$e_{in}$ = V the input voltage change for an output logic transition from one level to the other level
A = peak sine wave amplitude at the input to the comparator
w = frequency of the sine wave in radians per second
V = $A\sin\phi$ — $A\phi$ for small angles
$\phi$ = w T in radians for small angles $\phi$ is the phase error at the zero-crossing and the phase error between quadrature samples.

Still referring to FIG. 2 the aperture time as defined above is determined by the propagation delay through the comparators 40 and differential register 48. The conversion comparators 42, 44, 46 are high gain and implemented with gallium arsenide (GaAs) technology; they are coupled to inputs of comparators 50, 52, 54 respectively in differential register 48 in order to register logic level transistions. One skilled in the art will recognize that the comparators 42, 44, 46 would not be necessary if comparators 50, 52, 54 in the differential registers were available with higher gain. Furthermore, if the next generation of high gain comparators with registered logic levels has an RF bandwidth, then the downconverting to IF will be unnecessary. The aperture time is a time delay that results in a range error after spread spectrum signal processing. The time of arrival is referenced to the antenna 11 input port and the system lags can be calibrated out. The aperture time of zero-crossing detector 68 is typically 1 ns for a one foot range error. The pseudo-noise (PN) codes detected by the spread spectrum receiver 10 are 180 degree phase shifts of a received L-band carrier having a period of 300 picoseconds.

Figure 6:
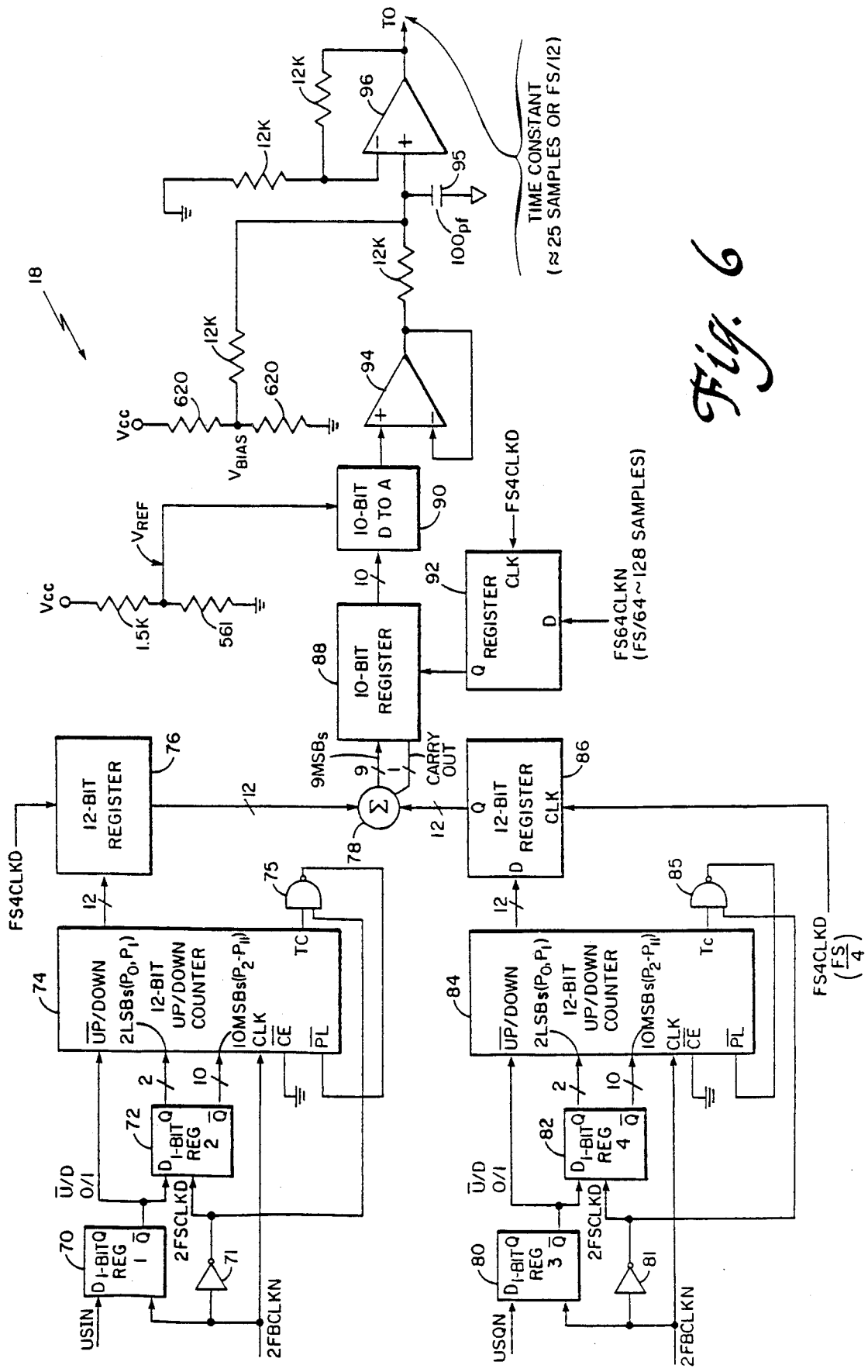
FIG. 6 is a functional diagram of a zero-means threshold controller for generating threshold level T0.
Figure 7:
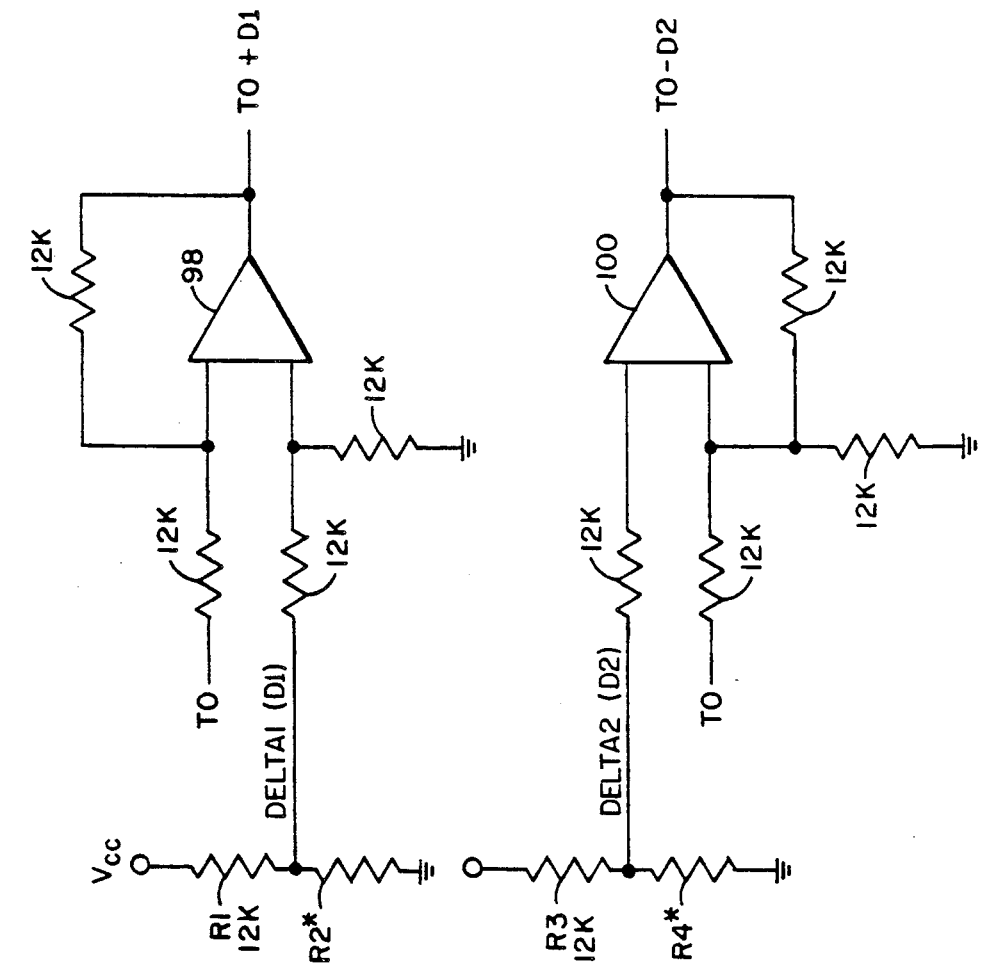
FIG. 7 is a schematic diagram of a zero-means threshold controller for generating thresholds T0+D1 and T0−D2.

Referring now to FIG. 6 and FIG. 7 the zero-mean threshold, T0, statistically sets the samples 50 percent above and 50 percent below the threshold in the presence of circuit drifts, changes in signal level and changes in interference level. The magnitude thresholds T0+D1 and T0−D2 are set a fixed distance above and below the T0 threshold to achieve a fixed probability of samples exceeding the set magnitude thresholds. The strategy for the PN spread spectrum receiver 10 to suppress CW and pulsed CW interference is to have fast AGC to follow the jammer amplitude envelope but not fast enough to follow jammer plus carrier amplitude changes due to the PN code modulation. The strategy for overcoming noise jammers is to hold minimum AGC in order to use the full gain of the system. The received carrier plus noise may or may not limit depending on jammer noise level. Signal processing techniques using the sign and magnitude bits can be used to identify CW, swept CW or pulsed CW jammers from noise jammers.

The T0 threshold is slow enough so as not to follow the jammer's phase modulations on the received carrier. If not for the difference in offsets between the sign bit comparator 42 and magnitude comparators 44, 46, the AGC would control the gain to have approximately 10 percent of the samples fall above the upper magnitude threshold and 10 percent below the lower magnitude threshold. The percentage outside crossings are very robust when the signal is buried in noise; a 30% change in outside crossings has negligible loss and a larger change can be tolerated with CW interference. Samples falling between the upper and lower magnitude thresholds are given unity weight in a correlator of the spread spectrum signal processor 24 while samples falling above the upper magnitude threshold and below the lower magnitude threshold are given weight R in the correlator. It is the setting of R greater than unity that enables the rejection of pulsed swept or continuous CW interference. The linear 2 bit IF sampler 14 has an R factor equal to 3. An R factor other than 3 would make the IF sampler non-linear.

When no jamming occurs, the T0 threshold detects the zero-crossing of the PN code transitions (i.e., the 180 degree phase shifts of the received RF carrier signal). With the occurrence of heavy jamming the received RF carrier signal is riding on the jammer frequency and the T0 threshold is detecting the zero-crossings of the jammer.

Figure 8:
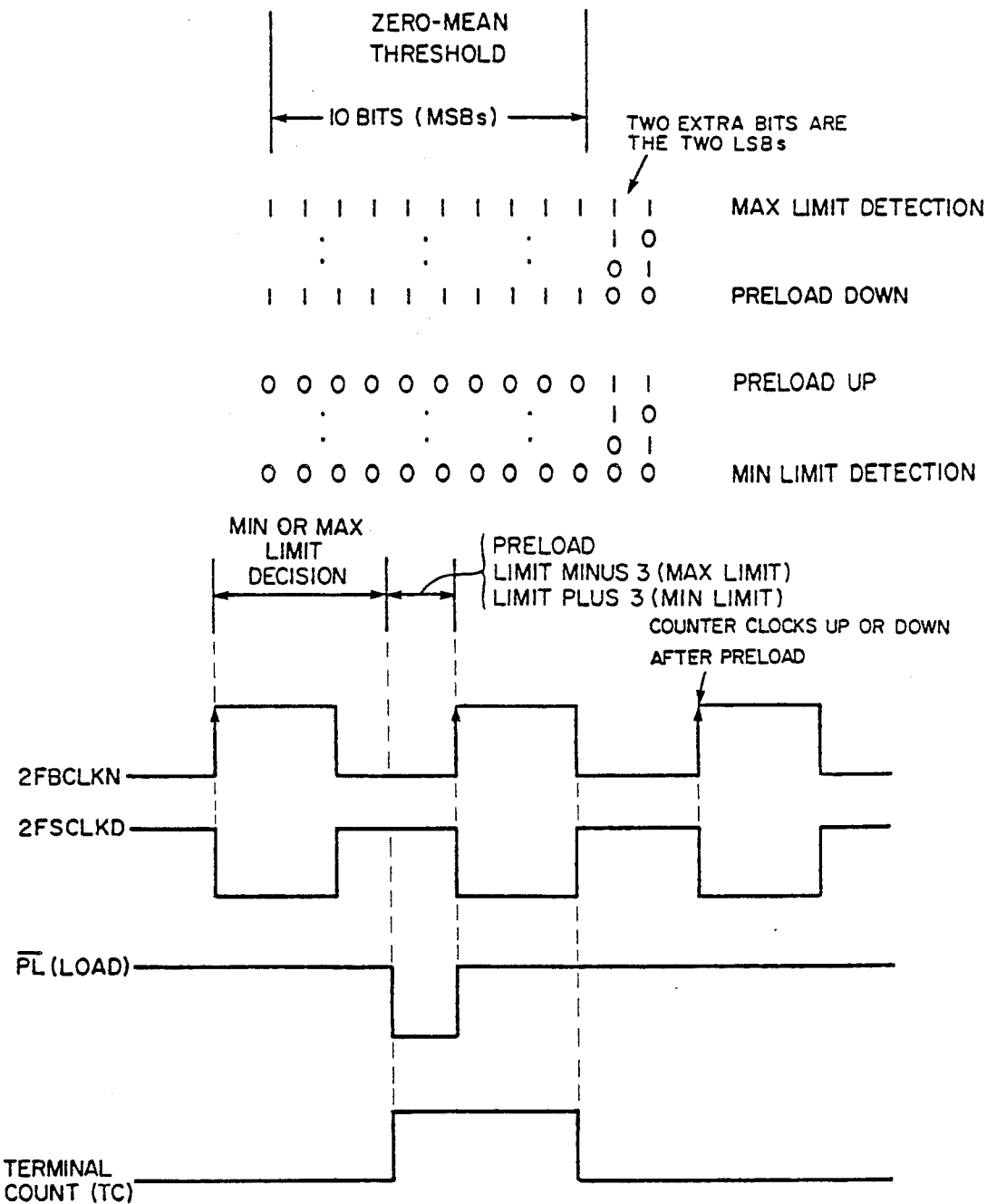
FIG. 8 shows the timing signals for zero-mean threshold MIN/MAX limit control.

Referring now to FIGS. 6, 7 and 8, the zero-mean threshold controller 18 is shown which generates the T0, T0+D1 and T0−D2 threshold signal levels that are coupled to the IF sampler 14. FIG. 6 shows the circuits for generating T0. The zero-mean threshold controller 18 sets the T0 threshold to approximately one millivolt offset using a 10-bit D/A 90. This allows the threshold to drift to one-tenth of the aperture jitter between updates, i.e., to plus or minus 4 millivolts, for the GaAs comparator 40 with a gain of 36 dB. The logic state of the sign bits (USIN, USQN) is used to count up or down on each sample via the 12 bit up/down counters 74, 84. The advantage of IF sampling is that every other I sample and every other Q sample is opposite in sign. It takes approximately 25 samples for a statistical average. The zero-mean threshold up/down counters 74, 84 are clocked every 128 samples, and the time constant for a step change in the threshold level is 25 samples. The sign bit is latched in register 1 (Reg 1) 70 to control counting up or down and is re-registered a half-clock later in register 2 (Reg 2) 72 for overflow and underflow control. The most significant bits of the up/down counters 74, 84 are used for generating the T0 zero-mean threshold and the least significant bits are used for overflow/underflow control, although a minimum of only one extra bit is actually required. The overflow/underflow circuit timing is shown in FIG. 8 in addition to the preload up and preload down counts. Overflow (the max limit) is detected when the counters 74, 84 reach a count of all ones and underflow (the min limit) is detected when the counters reach all zeros. The extra bit in the counters 74, 84 allows the count to be preloaded down on overflow and preloaded up on underflow.

The up/down counters 74, 84 are asynchronously presettable binary up/down synchronous counters. Presetting the counter to the number on preset data inputs (P0–P11) is accomplished by setting LOW the asynchronous parallel load input ($\overline{PL}$). Counting occurs when $\overline{PL}$ is HIGH, count enable ($\overline{CE}$) is LOW and the $\overline{Up}$/Down (U/D) input is either LOW for up-counting or HIGH for down-counting. The counter is incremented or decremented synchronously with the LOW-to-HIGH transition of the clock. When an overflow or underflow of the counters 74, 84 occurs, the terminal count (TC) output, which is LOW during counting, goes HIGH and remains HIGH for one clock cycle. The terminal count output for the 12-bit counters 74, 84 is gated with clock 2FSCLKD by AND gates 75, 85 for a deglitched asynchronous parallel load as shown in FIGS. 6 and 8. The 2FSCLKD clock is derived from 2FBCLKN generated in the I and Q samples aligner 16. The 2FSBCLKN is essentially a buffered and inverted 2FS clock. The sign bits USIN and USQN control counters 74, 84 counting up or down control and the preset data input registers 72, 82 (P0 to P11). The counting logic is defined in Table 2.

TABLE 2

| USIN or USQN | COUNTING REG 1 or 3 $\overline{Q}$ (UP/DOWN) | PRESET INPUTS REG 2 or 4 Q(P0, P1) | Q(P2 to P11) |
|---|---|---|---|
| 1 | 0(UP) | LSBs 0 | MSBs 1 |
| 0 | 1(DOWN) | LSBs 1 | LSBs 0 |

With IF sampling, only one counter clocked at the 4FS sampling rate is required for zero-mean threshold control. However, the preferred embodiment comprises two counters 74, 84, one for I and one for Q. This enables the use of low power CMOS logic clocked at 2FS, and the 4FS samples sorted for I and Q are still at IF. The outputs of the I and Q up/down counters 74, 84 are stored in 12-bit registers 76, 86 to use all the samples at a FS4CLKD clock rate and the outputs of such registers 76, 86 are added together by adder 78. The nine MSBs and the carry-out (CO) of the resultant sum is clocked into a 10-bit register 88 by a FS64CLKN clock signal which is reclocked by an FS4CLKD signal coupled to register 92 for timing alignment and to reduce data latency. The output of the 10-bit register 88 is coupled to the 10-bit D to A converter 90. A step input to the D/A 90 at the FS64CLKN clock rate results in a T0 output time constant of approximately 25 samples set by the clock rate and 100 pf capacitor 95. The output of the D/A 90 is coupled to amplifiers 94 and 96 where it is amplified and summed with a bias voltage ($V_{BIAS}$) which is $V_{CC}/2$ for the T0 threshold. T0 is generated at the output of amplifier 96. The T0 output voltage range is one volt minimum and typically from two to three volts. T0 is coupled to amplifiers 98 and 100 as shown in FIG. 7 for generating the thresholds T0+D1 and T0−D2. Resistor R2 and R4 set the D1 and D2 voltage levels and compensate for any comparator offsets. If there was no difference in offsets between the sign and magnitude comparators 42, 44, 46 used to detect the sign (SN) and magnitude (M) inputs in the IF sampler 14, the magnitude of the deltas (D1 and D2) of the thresholds T0+D1 and T0−D2 would be identical. D1 and D2 are approximately $V_{CC}/20$ in the present embodiment.

When the input sign bit (SN) is pulled up to a logic high, the counters 74, 84 count up to limit and hold between the maximum preload and maximum count (all ones) shown in FIG. 8, and the T0 output is 3.0 volts or greater. When the input sign bit (SN) is pulled low, the counters 74, 84 count down to the minimum limit and hold between the minimum preload and minimum count (all zeros), and the T0 output is 2.0 volts or less. When the input sign bit is pulsed with a square wave between logic high and logic low levels and a period that counts between limit levels, the T0 output is a triangle waveform with a period equal to 2048 samples.

Figure 9:
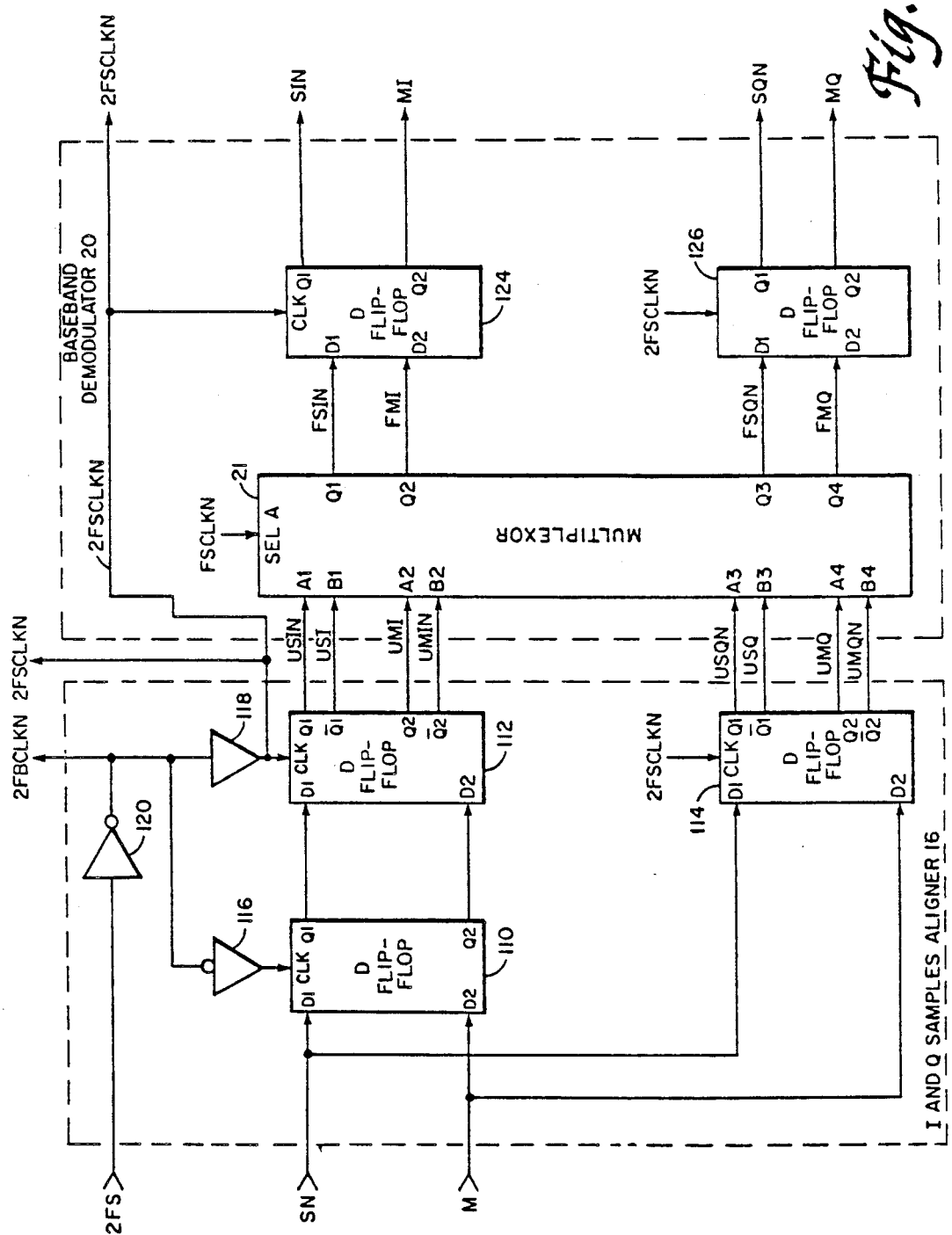
FIG. 9 is a functional logic diagram of an I and Q samples aligner and baseband demodulator.

Referring to FIG. 3 and FIG. 9, the baseband conversion logic is shown comprising the I and Q samples aligner 16 coupled to a baseband demodulator 20. The I and Q samples aligner 16 reclocks the I and Q sign (SN) and magnitude (M) samples on both the rising and falling edges of the 2FS clock as shown in FIG. 3 to sort and align in time the resulting $I_{nD}$ (USIN, USI, UMI, UMIN) and $Q_n$ (USQN, USQ, UMQ, UMQN) samples 16. The $I_n$ sample (SN and M) is first clocked into D flip-flop 110, and then when the $Q_n$ sample (SN and M) is clocked into D flip-flop 124, the $I_n$ sample is transferred into D flip-flop 112 becoming a delayed $I_n$ sample or $I_{nD}$ as illustrated in FIG. 3. Hence, the $I_{nD}$ and $Q_n$ samples can now both be processed in parallel or at the same clock time instead of in a sequence as $I_n$ and $Q_n$ samples originally occurred. The 2FS clock is divided by 2 in counter 130 (as shown in FIG. 10) for generating FSCLKN which is coupled to multiplexor 21. To interpret the samples at baseband, it is necessary to correct for the alternating signal polarity associated with the IF carrier signal. In principal this is done by multiplying alternate samples of both the I and Q sequences by −1. In the present embodiment the I and Q samples are converted to baseband demodulation by simply inverting the sign and magnitude bits on every other pair of I and Q samples. Hence, multiplexor 21 selects the inverted I and Q samples (USI, UMIN, USQ, UMQN) for every other pair of I and Q samples (the other pair being USIN, UMI, USQN, UMQ) to accomplish the baseband demodulation. The sign and magnitude I and Q outputs from the multiplexor 21 (FSIN, FMI, FSQN FMQ) are coupled to D flip-flops 124, 126 to reduce timing skews and then are coupled to the spread spectrum signal processor 24 at a 2FSCLKN clock rate.

Referring to FIG. 10, the timing signals generated by the timing generator 23 are shown using the 2FSCLKN clock input derived from 2FS in the I and Q samples aligner 16. The FSCLKN clock is counted down in a binary counter 130 to generate a plurality of timing signals such as FSCLKN, FS2CLKN, FS4CLKN, FS8CLKN, FS16CLKN, FS32CLKN, FS64CLKN and FS128CLKN (the letter "N" at the end of a signal name indicates negative logic). The critical timing clocks FS2CLKN and FS4CLKN are coupled to a register 132 where they are resyncronized by the 2FSCLKD clock (i.e., a clock opposite in phase from the binary counter 130 clock input) and signals FS2CLKDN, FS2CLKD, FS4CLKDN and FS4C4KD are generated at the outputs of register 132. This resynchronization avoids timing skews and results in system operation almost independent of a particular logic family selected for the preferred implementation.

Figure 11:
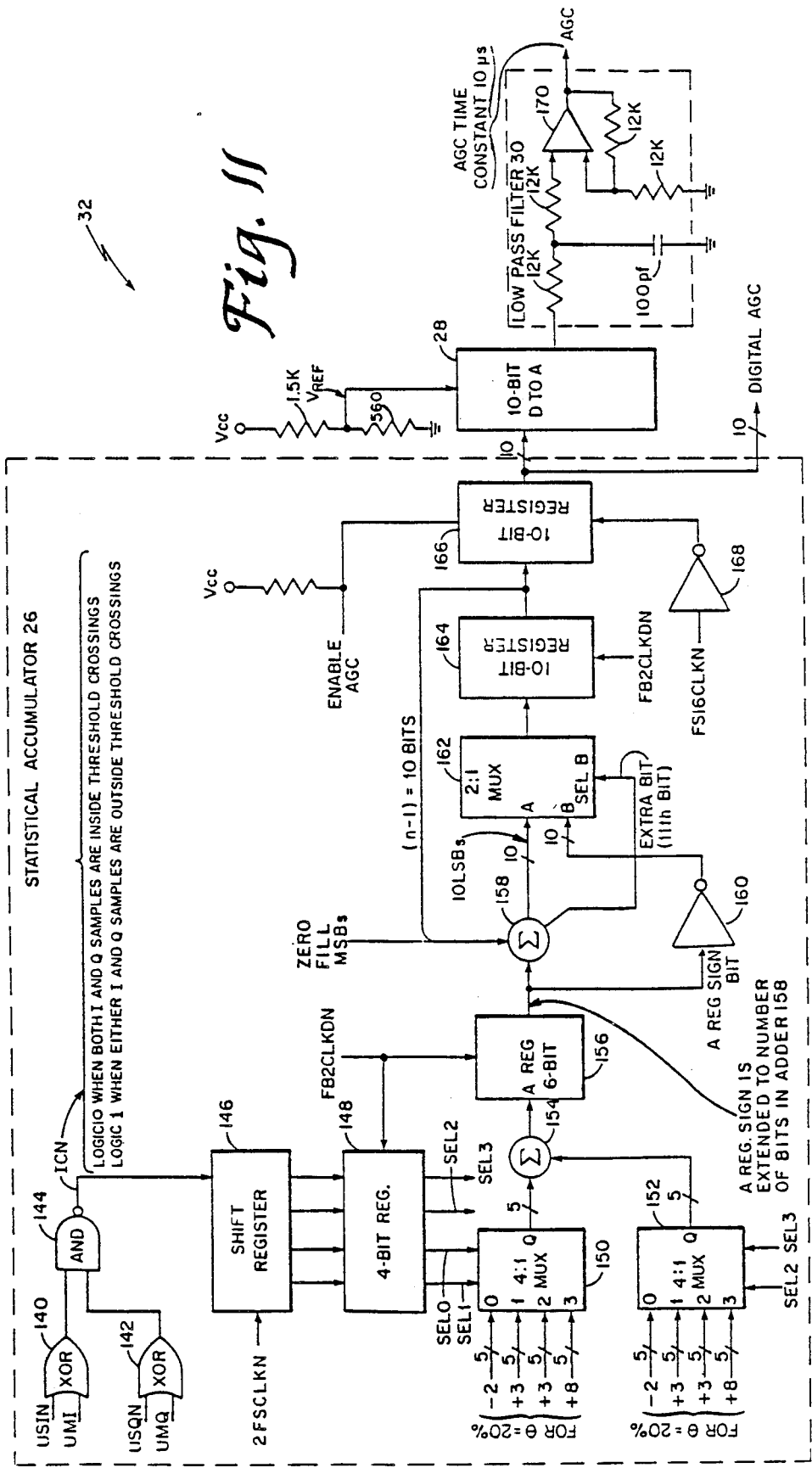
FIG. 11 is a functional logic diagram of an automatic gain control (AGC) portion of the spread spectrum detector.

Referring now to FIG. 11, the logic for the automatic gain control, AGC control 32, is shown comprising a normalized statistical accumulator 26 which sets the AGC level for the receiver IF section 13. The statistical accumulator 26 determines a weighted summation based on the number of outside threshold crossings (i.e., the number of times the peak amplitude of the IF signal exceeds the T0+D1 and T0−D2 thresholds). The sign bit is exclusive-or'ed with the most significant magnitude bit by XOR gates 140, 142 to determine outside crossings and the outputs of the XOR gates 140, 142 are ANDed together by AND gate 144 generating ICN to determine if both the I and Q samples are inside thresholds crossings. If either one of the I or Q samples is an outside thresholds crossing, then the ICN output of AND gate 144 is a logic 1 indicating an outside thresholds crossing. If both I and Q samples are inside threshold crossings, then the ICN output is a logic 0. Table 3 shows the statistical accumulator 26 weighting factors for each ICN logic state output of AND gate 144. The factor N is determined as a function of the percentage of outside threshold crossings $\theta$, and N equals four (4) for equal to 20%. Therefore, in the present embodiment when the I or Q sample is above the magnitude outside threshold level, four (4) is added to the accumulated value and when I and Q are both below the magnitude threshold level, a one (1) is substracted from the accumulated

TABLE 3

| I or Q |   |         |              |                  |
|--------|---|---------|--------------|------------------|
| $\bar{S}$ | M | $\bar{S}$ XOR M | Statistical | Accumulator |
| 1      | 1 | 0       | Add N        | outside crossing |
| 1      | 0 | 1       | Substract 1  | inside crossing  |
| 0      | 1 | 1       | Substract 1  | inside crossing  |
| 0      | 0 | 0       | Add N        | outside crossing | value.

Since $\theta$ equals the percent of outside threshold crossings for both I and Q samples, then $100\% = 100 - \theta + \theta$ and the statistical accumulator 26 nulls-out at $-1 \times (100 - \theta) + N \times \theta$. The values of N for $\theta$ equal to 10, 20 or 25 percent are shown in Table 4.

TABLE 4

| $\theta$ | N |
|----------|---|
| 10%      | 9 |
| 20%      | 4 |
| 25%      | 3 |

The ICN output from AND gate 144 is coupled to shift register 146 which is clocked at the 2FSCLKN rate. The results of four samples are saved in shift register 146 and stored in a 4-bit register 148 at a buffered clock rate of FB2CLKDN which is the 2FSCLKN clock divided by 4. The select lines SEL0, SEL1, SEL2, SEL3 of the 4 to 1 multiplexers 150 are coupled to the 4-bit register 148 outputs and are used to transfer preprogrammed weighting factors for each of four samples to a partial adder 154 when $\theta$ equals 20 percent in the present embodiment. The preprogrammed weighting factor inputs to MUX 150 are for two samples and such inputs to MUX 152 are for another two samples of the four samples set; the select codes for both multiplexers 150, 152 are listed in Table 5. Table 5 shows the preprogrammed inputs selected by multiplexers 150, 152 for input to adder 154 for $\theta$ equals 20%.

TABLE 5

| MUX 150/MUX 152 | | WEIGHTING FACTOR | |
|---|---|---|---|
| SEL1/SEL3 | SEL0/SEL2 | INPUT TO ADDER 154 FOR $\theta = 20\%$ | TWO SAMPLES |
| 0 | 0 | −2 | Both inside |
| 0 | 1 | +3 | One inside & one outside |
| 1 | 0 | +3 | One outside & one inside |
| 1 | 1 | +8 | Both outside |

A 5-bit weighting factor output for 2 samples from mux 150 is coupled to a first input of the partial adder 154 and a 5 bit weighting factor output for another 2 samples from mux 152 is coupled to a second input of adder 154. The total weight of the four sample set is calculated by adder 154 and stored in a 6 bit A register 156. This method of calculation allows more time for carry propagation in the full precision 11-bit adder 158 which is coupled to the outputs of A register 156.

An extra bit in the 11-bit adder 158 of statistical accumulator 26 is used for overflow and underflow control of the statistical accumulator 26 in order to automatically reach a null at the correct AGC level, regardless of the initial conditions of the statistical accumulator 26 at power on. At underflow the statistical accumulator 26 holds at minimum output (all zeros) and at overflow it holds at maximum output (all ones). The extra bit in the adder 158 is not registered, but it is used with the sign bit from A register 156 to determine overflow or underflow. With an n-bit adder, the nth bit is the extra bit and n-1 least significant bits (LSBs) are registered for setting the AGC level. The logic for using the extra bit in the adder 158 is shown in Table 6. One skilled in the art is familiar with the prior art approach of using the carry-out of an adder for overflow and underflow detection which takes more processing time by having to wait for carriers to propagate.

TABLE 6

| A REG SIGN | EXTRA BIT | OUTPUT 2:1 MUX 162 |
|---|---|---|
| 0 | 0 | ADDER 158 OUTPUT |
| 0 | 1 | OVERFLOW CONDITION (MAX VALUE ALL 1'S) |
| 1 | 0 | ADDER 158 OUTPUT |
| 1 | 1 | UNDERFLOW CONDITION (MIN VALUE ALL 0'S) |

Figure 12:
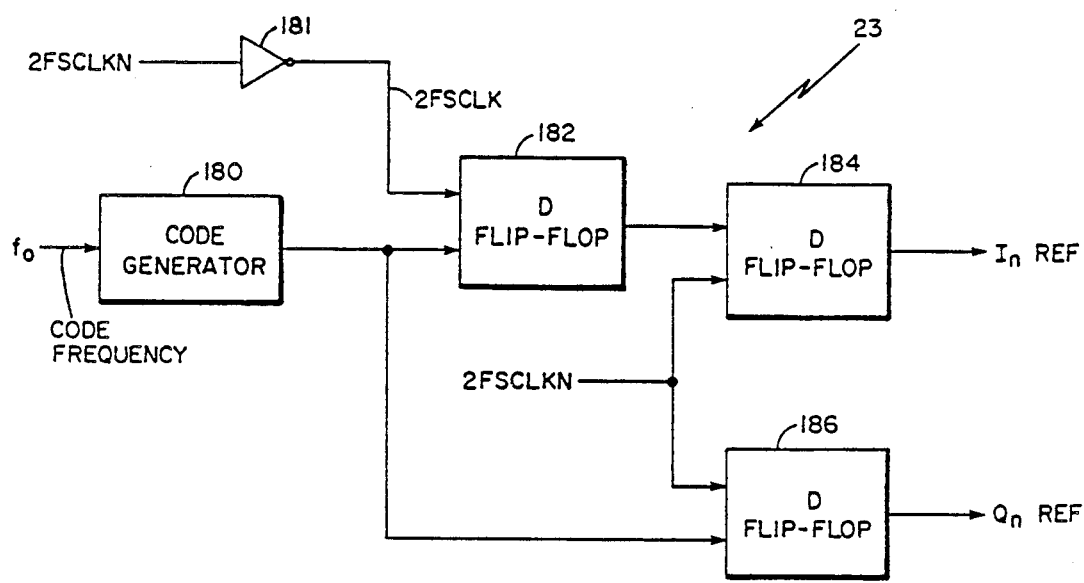
FIG. 12 is a block diagram of an I and Q reference aligner located in a spread spectrum signal processor.

Still referring to FIG. 11, the A REG sign bit is extended to the number of bits in adder 158 and it is also inverted by inverter 160 and used for generating the 10 bit output from adder 158 when overflow or underflow is detected. The extra bit is used as the select line for a 2:1 mux 162 to select the adder 158 output ten bits or the output of the A REG 156 sign bit inverted and extended to ten bits by inverter 160 for transfer to the 10-bit register 164 which is clocked by FB2CLKDN. If only the carry-out was used, the operation would be slower due to the carry propagation. The extra bit allows the adder 158 to run faster and still control overflow and underflow. The extra bit in the accumulator 158 is not registered. Hence, with an n-bit accumulator the nth bit is the extra bit and n-1 least significant bits are stored in 10-bit registers 164, 166 for generating the digital AGC level. The 10-bit output of register 164 is the accumulated value that is fed back to the full precision adder 158 inputs with the MSBs being zero-filled for maintaining a positive accumulated value. It is also transferred to 10-bit register 166 for providing a digital AGC word in accordance with the FS16CLKN clock coupled to register 166. The digital AGC word is coupled to the 10-bit digital to analog (D to A) converter 28 for D to A conversion at an FS16CLKN clock rate. The FS16CLKN clock is the FSCLKN clock divided by 16 or the 2FSCLKN clock divided by 32. The analog output from the 10-bit D to A 28 is coupled to low pass filter 30. The amplifier 170 in low pass filter 30 and voltage reference (VREF) set the gain for the AGC scale factor. The AGC scale factor is approximately 70 db per 3 volts. The system AGC time constant is 10 microseconds, and it is set by the system timing and low pass filter 30. The AGC time constant is determined by the PN-code frequency and correlation intervals. When the two PN-codes are 10.23 MHz and 1.023 MHz and the correlation interval is 1 ms, the AGC requirement is as follows:

PN-code<<AGC TIME CONSTANT<<CORRELATION INTERVAL 0.1 microsecond<<10 microsecond<<1000 microseconds Referring now to FIG. 3 and FIG. 12, the logic for the I and Q reference aligner 23 is shown comprising similar logic as shown in FIG. 9 for the I and Q samples aligner 16. The I and Q reference aligner 23 is included in the spread spectrum signal processor 24 to facilitate the parallel processing of I and Q samples. The PN code frequency $f_o$ generated by the 4FS clock synthesizer 22 is coupled to a code generator 180. The code generator 180 provides a replica of the PN code modulated on the received RF carrier signal. The replicated PN-code is the reference which is aligned in time with the I and Q samples as shown in FIG. 3 in order to perform the spread spectrum signal processing. As shown in FIG. 3 the $I_n$ REF signal is delayed in order to line up $I_{nD}$ REF with the $Q_n$ REF signal. This delay is accomplished by the D flip-flop 182 which is clocked by 2FSCLK, and the output of D flip-flop 182 is transferred to D flip-flop 184 when the D flip-flop 186 stores the $Q_n$ REF signal at the 2FSCLKN time such that $I_n$ REF and $Q_n$ REF are now available for processing in parallel during the same time interval.

This concludes the description of the preferred embodiment. However, many modifications and alterations will be obvious to one of ordinary skill in the art without departing from the spirit and scope of the inventive concept. For example, comparators 42, 44, 46 in the IF sampler 14 would not be necessary if comparators 50, 52, 54 of digital register 48 were available with higher gain, and down converting at IF would be unnecessary if the comparators of the differential register 48 had an RF bandwidth. In addition, in the statistical accumulator 26 the processing of four (4) weighted ICN samples was performed in one clock interval in order to use low power, low speed logic for implementing the statistical accumulator 26. With high speed logic each weighted ICN could be directly accumulated in the full precision adder 158 eliminating shift register 146, 4-bit Reg 148, 4:1 multiplexors 150, 152, adder 154 and 6-bit A Reg 156, which would all be replaced with a 2:1 multiplexor that weights each ICN logic state. For $\theta = 20\%$, the weighting for ICN logic 0 would be $-1$ and for ICN logic 1 the weighting would be $+4$. Therefore, it is intended that the scope of this invention be limited only by appended claims.

What is claimed is:

1. A zero-crossing detector for sampling in sequence in-phase (I) and quadrature (Q) components of an input signal comprising:

means for comparing a sampled signal to threshold signal levels, a first one of said threshold signal levels (T0) set for detecting zero-crossings of said sampled signal, a second one of said threshold levels (T0+D1) set for positive increment above T0, and a third one of said threshold levels (T0−D2) set for a negative increment below T0;

means coupled to said comparing means for storing a sign and magnitude measurement of said sampled signal, said magnitude being stored in a first register if said magnitude is positive or stored in a second register if said magnitude is negative; and means coupled to said sign and magnitude measurement storing means for selecting said first or second register output in accordance with said stored sign measurement.

2. A method of performing zero-crossing detection for sampling in sequence in-phase (I) and quadrature (Q) components of an input signal comprising the steps of:

comparing a sampled signal to threshold signal levels, a first one of said threshold signal levels (T0) set for detecting zero-crossings of said sampled signal, a second one of said threshold levels (T0+D1) set for positive increment above T0, and a third one of said threshold levels (T0−D2) set for a negative increment below T0;

storing a sign and magnitude measurement of said sampled signal, said magnitude being stored in a first register if said magnitude is positive or stored in a second register if said magnitude is negative; and selecting said first or second register output in accordance with said stored sign measurement.

* * * * *